Patented Oct. 16, 1945

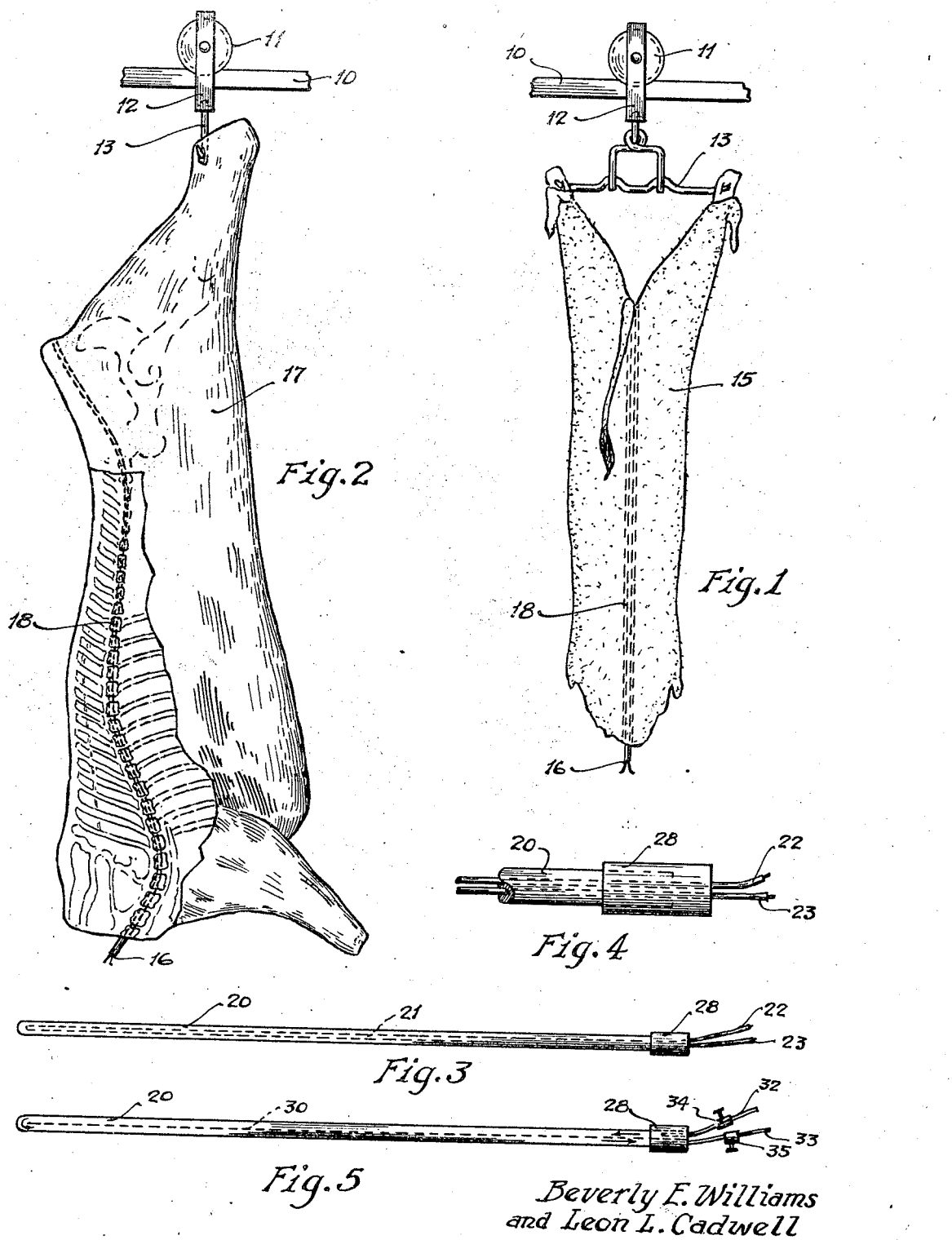

2,387,221

UNITED STATES PATENT OFFICE 2,387,221

TREATMENT OF ANIMAL CARCASSES

Beverly E. Williams and Leon L. Cadwell, Chicago, Ill., assignors to Industrial Patents Corporation, Chicago, Ill., a corporation of Delaware Application April 3, 1942, Serial No. 437,506

9 Claims. (Cl. 99—107)

This invention relates to the treatment of edible animal carcasses. More particularly, it relates to a method of adding heat to such carcasses for the purpose of tenderizing the meat or for the purpose of thawing frozen carcasses.

In the commercial preparation of carcass meat, it is often necessary to add heat to the carcass in certain operations. For example, in tenderizing, the meat is often raised to a certain temperature and maintained at that temperature for a period of time to permit the enzymes to act causing tenderization. Also it is quite common to freeze a carcass for the purpose of storage and thereafter before the frozen meat is consumed or marketed, it is necessary to defrost or thaw it. In each of these instances difficulty is encountered in securing a uniform temperature throughout the meat during the temperature change. Thus if the heat is obtained from the surrounding atmosphere, the surface will become warm at a much faster rate than the interior of the meat. Consequently, certain portions of the meat will be at a fairly warm temperature while other portions will be in a substantially frozen condition. In the portions of the meat having the higher temperature different reactions will occur or the reactions therein will take place at a different speed than in those portions of the meat having a lower temperature.

It is customary in the commercial preparation of carcass meat, such as beef and lamb, to remove the skin and thereafter transfer the skinned carcass to a cooler wherein the temperature may be lowered to around freezing or sometimes substantially below. In the treatment of calf carcasses, the skin is generally left on until the meat is cooled and then the skin is removed from the cold carcass. The skinned calf carcass may be held in a cooler at temperatures around freezing or substantially below. After storage period which may consume from two to three weeks, the aged carcass is frozen and thereafter kept in a frozen condition during storage and shipping or until it is marketed. Before marketing, the frozen carcass is thawed by the distributor or the butcher and the carcass is cut into wholesale cuts. The thawing according to conventional practice takes place in a room at about 40 to 50 degrees Fahrenheit and usually requires for beef about 24 to 36 hours, for veal about 20 to 30 hours and for lambs around 18 to 30 hours. It will be observed that this thawing period is quite expensive due to the length of time of refrigeration and the storage space required. Also the outer portion of the meat is thawed much more rapidly than the inner portions and as a result the outer portion is maintained at a higher temperature for a considerably longer period of time than the inner portion causing darkening and drying out of the surface and a difference in tenderness of the inner and outer portions of the meat.

An object of the present invention is to heat tenderize carcass meat whereby all portions of the meat are uniformly tenderized.

Another object of the invention is to thaw meat in such a way that the thawing progresses from the interior outwardly.

A further object of the invention is to alter quickly the temperature of the meat without affecting the quality thereof.

Also an object of the invention is to heat the interior of carcass meat or wholesale cuts thereof, without adversely affecting the bloom, color, or natural appearance of the surface.

The present invention contemplates broadly the application of heat to the major bone structure of the carcass to cause a rise in temperature of the meat and to maintain the temperature of the interior of the meat at least as high or higher than the exterior. We preferably apply a heating medium to the spinal column of the carcass and permit the heat to be radiated and/or to be conducted outwardly from this source.

According to one modification of the invention the whole carcass such as beef, lamb, and veal is skinned on the killing floor and a heating element inserted in the spinal column. The carcass is then transferred to the cooler wherein the carcass is allowed to age for two or three weeks and wherein the temperature is reduced to near freezing. After aging the chilled carcass is transferred to a freezer maintained at around zero degrees Fahrenheit wherein the carcass is frozen solid and in which condition it is maintained until marketed or shipped. In the case of calves it is sometimes desirable to delay the skinning until sometime after the carcass is chilled or frozen. In handling beef, the carcass is usually split into sides on the killing floor. However, we may leave the carcass intact and insert the heating rod in the spinal column of the beef as aforesaid.

When it is desired to market the frozen meat and prior to cutting the meat into wholesale cuts heat is applied to the heating element in the spinal column. In this way the frozen carcass thaws or defrosts from the interior toward the exterior as the result of the radiation and/or conduction of the heat from the heating element to the meat. After the meat is thawed to about freezing temperatures or slightly above, the heating element is removed and the meat is cut into quarters or other wholesale cuts.

According to another modification of the invention, a freshly skinned carcass is fitted with a heating element in the spinal column as described above. The carcass is then transferred to a cooler maintained at about freezing temperatures or slightly above. Before or after the carcass reaches the temperature of the cooler, heat is applied to the heating element whereby the interior of the carcass is maintained at a temperature in excess of 50 degrees Fahrenheit and not substantially in excess of 70 degrees Fahrenheit and preferably around 60 degrees Fahrenheit. The temperature of the interior of the meat is maintained for a sufficient time to secure adequate tenderization of the meat. The time required is usually about one to three days and preferably about 48 to 60 hours. The tenderized carcass may be marketed as such or transferred to a freezer and frozen so that it can be stored until it is desired to market or ship it. The heating element may be removed at the end of the tenderization operation or left in for use in thawing in case the carcass is frozen after tenderizing.

For purposes of more fully describing the invention, reference will now be made to the accompanying drawing.

Figure 1 is a view of the back of an unskinned calf carcass on a dressing rail showing the heating element inserted in the spinal column.

Figure 2 is a side view partly in section of a round dressed beef on the dressing rail after the skin has been removed and the heating element inserted in the spinal column.

Figure 3 is a horizontal view of a heating element adapted for use with electric current as the source of heat.

Figure 4 is an enlarged view of the end of the heating element of Figure 3 showing certain details in the end structure thereof.

Figure 5 is a horizontal view of a modified form of heating element adapted for using water or other fluid as the heating medium.

In the drawing the dressing rail 10 which may be located on the killing floor is adapted for suspending a trolley comprising a roller 11, hook 12 and gam spreader 13. The gam spreader is adapted for suspending the carcass from the hind legs at the gam cords. Referring more particularly to Figure 1, a calf carcass 15 with the hide on is shown suspended from the dressing rail and fitted with the heating element 16 extending the length of the spinal cavity 18. In Figure 2 is shown a round dressed beef 17 with the hide removed and containing the heating element 16 in the spinal column 18.

The heating element as shown in Figure 3 comprises a flexible metallic tube 20 which may be made of any suitable flexible material. We have found that a tubing made of thin stainless steel to be satisfactory. The tube contains a resistance wire 21 having terminals 22 and 23. This resistance wire is preferably insulated with a suitable insulation material such as rubber or asbestos. We have used successfully an insulation consisting of asbestos 1/64 inch in thickness. The heating element may comprise one or more strands of looped wire extending throughout the length of the tube or may comprise two strands of looped wire running for a portion of its length and a single strand of looped wire spliced to the end of the two strands to give a greater heating effect for a portion of the length of the heating element.

As shown in Figure 4, the end of the heating element 20 is provided with a collar 28 comprising an asbestos tubing which fits over the end of the stainless steel tubing. The collar protects the feed wires and also provides a gripping member for protecting the operator's hands against shock or burn when inserting, removing or adjusting the heating element in the spinal column.

In Figure 5, the heating element is shown adapted for the use of a fluid such as hot water or steam as the heating medium. The tube 20 is provided with a vane 30 dividing the tube into two portions having communication therebetween and with an inlet 32 and an outlet 33 which are equipped with valves 34 and 35, respectively. The heating fluid may be introduced in regulated amounts through the pipe 32 and circulated through the tube around the end of the vane 30 and out through the pipe 33.

In practicing the invention as applied to the thawing of a carcass, we prefer to predetermine the amount of heat input required for a representative carcass intended to be treated. If the invention is used for defrosting or thawing a carcass, it will be found that by determining the conditions for defrosting a given carcass from a commercial cooler or freezer, that these same conditions may be used thereafter in treating a "lot" of the same carcasses since they will run substantially uniform in temperature. Thus we may predetermine the amount of current that is required to thaw a carcass during a given period of time and use this result for guidance in subsequent operations. We have found it desirable to maintain the temperature in the heating element as high as possible to accelerate the thawing and to avoid burning or cooking of the meat. In the use of electricity for heating the amount of heat input may be controlled and measured by suitable resistances, volt meters and ammeters. In this way the current input and the temperature level may be determined initially by experimentation and thereafter the conditions controlled by instruments. In using hot water or steam as the heating medium, the temperature of the inlet fluid may be controlled by suitable thermometers and by the valves. The amount of heat input should be controlled so that the heat is absorbed by the cold carcass in thawing or defrosting without an accumulation of heat within the carcass to cause cooking or burning. The above menthod of operation also applies to processes wherein the meat is tenderized instead of defrosted or thawed.

An illustration of the operation of the invention will now be given as applied to the thawing of veal carcasses. A round dressed veal carcass weighing 120 pounds with the hide on was fitted with an electrical heating unit while warm on the dressing rail of the killing floor. The heating unit was inserted in the spiral column and extended from the vertebra at the neck to the tail joint. The carcass containing the heating element was chilled for a period of about 24 hours in a cooler maintained at about 35 degrees Fahrenheit. The chilled carcass was then transferred to a freezer wherein the temperature of the carcass was reduced to about zero degrees Fahrenheit and thereby frozen solid. When it was desired to market the carcass, it was removed from the storage freezer and again placed in a cooler held at about 35 degrees Fahrenheit. The frozen carcass in the cooler was thawed by applying electricity to the heating element.

The data given in the table below are those obtained in thawing a veal carcass frozen with the hide on. The heating element comprised a rod 39 inches long and 1/8 inch in diameter and containing an insulated resistance element made of No. 26, B. & S., Nichrome wire. The temperatures of the meat were measured by inserting thermometers into wells drilled in the frozen carcass at the center of the thickest portions of the shoulder, back (about the 7th rib) and both hind legs. The heating rod temperatures are those developed at 5 amps. with 39 volts A. C. electricity.

| Time | Shoulder temp., °F. | Right hind leg temp., °F. | Left hind leg temp., °F. | Back temp. °F. | Heating rod temp., °F. |
|---|---|---|---|---|---|
| 0 | +5 | +3 | +3 | +3 | +36 |
| 1 | 12 | 9 | 10 | 13 | 183 |
| 2 | 17 | 13 | 14 | 19 | 187 |
| 3 | 20 | 17 | 18 | 24 | 186 |
| 4 | 22 | 19 | 20 | 26 | 176 |
| 5 | 24 | 21 | 22 | 28 | 182 |
| 6 | 25 | 23 | 23 | 30 | 179 |

As shown by the above temperatures the carcass at the end of 6 hours was substantially thawed. The heating rod was then removed and an inspection indicated good condition of the interior cavity. The thawed carcass was then allowed to stand over night in the cooler in order to equalize the temperature throughout. The carcass was thereafter skinned. The skinned carcass showed a good appearance and color of the skinned surface.

It will be observed from the above data that the carcass was thawed in approximately 6 hours whereas 24 to 36 hours are required by conventional practice. Moreover, in conventional practice the color and bloom of the surface of the meat is darkened and dehydrated and shows substantial deterioration due to the long exposure to the warm atmosphere necessary to attain thawing.

Instead of freezing the calf with the hide on we may remove the skin either on the killing floor or after initial cooling in the cooler. The skinned carcass may be frozen in a bare condition or after wrapping with a brine moistened cloth and with or without an outer paper bag substantially impervious to moisture. The cloth and bag, if any, may be left on until the carcass is thawed.

As another example of the invention, a sheep was skinned on the dressing floor and the skinned carcass transferred to a cooler. After the carcass had attained a temperature of approximately 35 degrees Fahrenheit the carcass was separated into wholesale primal cuts. One of these cuts, a double loin weighing about 10 pounds, was fitted with a heating element inserted into the spinal column. Hot water at a temperature of about 100 degrees Fahrenheit was circulated through the heating element for about 24 hours. The temperature was maintained at about 70 degrees Fahrenheit next to the spinal column, about 50 degrees Fahrenheit in the center of the loin, and about 37 degrees Fahrenheit just under the surface of the loin. The heating element was removed and the meat allowed to chill throughout to a temperature of around that of the cooler. The product was then cut into double English mutton chops. The chops prepared in this manner were found to have a better color and to be more tender and juicy than a similar product prepared without the heat tenderization with the heating element.

Instead of applying the heat unit to the spinal column it may be applied to other portions of the bone structure, such as the femur, chine bone and blade bone of the chuck, or any bone structure having a marrow cavity of sufficient size to insert the heating element. Also we may remove the marrow from the major bone structure and thereafter apply heat to said cavity; for example by circulating water or other fluid therein. The spinal cord or marrow, as the case may be, is removed by air or water pressure or by first blowing out with air and washing the cavity with water.

While we prefer to add the heat to the interior of the bone structure we may convey the heat along the bone structure in other ways; for example, a heating element may be inserted adjacent to and following the contour of the bone whereby the heat will be added to and radiated from the bone structure.

Also, instead of using a mechanical heating element we may also circulate the heating medium through the bone structure in direct contact with the bone.

Obviously, many modifications and variations of the invention hereinbefore set forth may be made without distinguishing from the spirit and scope thereof, and therefore only such limitations should be imposed as are indicated in the appended claims.

We claim:

1. A process for the heat treatment of animal carcasses, which comprises, adding heat to the interior of the major bone structure of the carcass meat and regulating the amount of heat added and the surface temperature of the meat whereby a higher temperature is maintained on the interior of the meat than on the surface.

2. A process for the heat treatment of animal carcasses, which comprises, adding heat to the marrow cavity of the major bone structure of the carcass meat and controlling the amount of heat added so that the heat is absorbed by the carcass and burning is avoided.

3. A process for the heat treatment of animal carcasses, which comprises, removing the spinal cord from the back bone while the carcass is warm and thereafter adding heat to the resulting cavity whereby heat is transferred through the bone to the carcass meat.

4. A process for tenderizing animal carcasses, which comprises, subjecting the carcass meat to tenderizing temperatures and adding heat to the interior of the major bone structure of the carcass to raise the temperature of the meat.

5. A process for tenderizing animal carcasses and wholesale cuts thereof, which comprises, adding heat to the interior of the major bone structure and correlating the amount of heat added and the surface temperatures whereby the interior of the meat is at least as high in temperature as the exterior and regulating the temperature in the interior to prevent burning of the meat.

6. A process for thawing animal carcasses, which comprises, applying heat to the interior of the major bone structure of the frozen carcass and regulating the amount of heat added so that the meat thaws at least as fast in the interior as in the exterior and controlling the temperature so that burning is prevented.

7. A process for the heat treatment of animal carcasses and wholesale cuts thereof, which comprises, adding heat to a substantial amount of the interior of the major bone structure of the carcass and controlling the amount of heat added whereby heat is transferred through the bone to the carcass meat and burning of the meat is avoided.

8. A process for the heat treatment of animal carcasses and wholesale cuts thereof, which comprises forming a heating zone in the interior of the major bone structure while the carcass is warm and thereafter adding heat to said zone in sufficient amount to cause the transfer of a substantial amount of the heat from said zone to the carcass.

9. A process for the heat treatment of animal carcasses and wholesale cuts thereof, which comprises, freeing portions of the bone cavities of the bone structure of the carcass of extraneous matter, freezing the carcass and raising the temperature interiorly of the bone cavities of the bone structure of the carcass and thawing the carcass by heat transmitted through the bone structure.

BEVERLY E. WILLIAMS.
LEON L. CADWELL.